(12) United States Patent
Pellenc

(10) Patent No.: US 10,091,947 B2
(45) Date of Patent: Oct. 9, 2018

(54) HAND-HELD POWER TOOL, AND IN PARTICULAR ELECTRIC PRUNING SHEARS WITH HEAT SINK

(71) Applicant: PELLENC (Societe Anonyme), Pertuis (FR)

(72) Inventor: Roger Pellenc, Pertuis (FR)

(73) Assignee: PELLENC (SOCIETE ANONYME), Pertuis (FR)

( * ) Notice: Subject to any disclaimer, the term of this patent is extended or adjusted under 35 U.S.C. 154(b) by 58 days.

(21) Appl. No.: 15/513,292

(22) PCT Filed: Nov. 3, 2015

(86) PCT No.: PCT/FR2015/052964
§ 371 (c)(1),
(2) Date: Mar. 22, 2017

(87) PCT Pub. No.: WO2016/083695
PCT Pub. Date: Jun. 2, 2016

(65) Prior Publication Data
US 2017/0251607 A1    Sep. 7, 2017

(30) Foreign Application Priority Data
Nov. 25, 2014  (FR) ...................................... 14 61405

(51) Int. Cl.
*B26B 15/00*      (2006.01)
*A01G 3/037*     (2006.01)
(Continued)

(52) U.S. Cl.
CPC .............. *A01G 3/037* (2013.01); *B26B 15/00* (2013.01); *A01G 3/033* (2013.01); *F28D 2021/0029* (2013.01); *F28F 2215/00* (2013.01)

(58) Field of Classification Search
CPC ......... B26B 15/00; A01G 3/037; G05G 21/00
See application file for complete search history.

(56) References Cited

U.S. PATENT DOCUMENTS

| | | | | |
|---|---|---|---|---|
| 1,755,511 | A | * | 4/1930 | Miller ..................... B26B 15/00 30/228 |
| 1,758,485 | A | * | 5/1930 | Vartanian ................ B26B 15/00 30/247 |

(Continued)

FOREIGN PATENT DOCUMENTS

| | | |
|---|---|---|
| AT | 504324 A4 | 5/2008 |
| CN | 203537937 U | 4/2014 |
| EP | 1688032 A1 | 8/2006 |

OTHER PUBLICATIONS

International Search Report for corresponding International Application No. PCT/FR2015/052964.

*Primary Examiner* — Sean Michalski
(74) *Attorney, Agent, or Firm* — Egbert Law Offices, PLLC

(57) ABSTRACT

A hand-held power tool, and in particular pruning shears, having an electric motor, a cutting member, and a transmission linking the electric motor to the cutting member, the motor and the transmission being housed in a main housing. An intermediate housing, made from a heat conductive material, is housed inside the main housing, the intermediate housing being in thermal contact with the electric motor. At least one heat sink is linked to the intermediate housing, and projects out of the main housing.

15 Claims, 2 Drawing Sheets

(51) Int. Cl.
*A01G 3/033* (2006.01)
*F28D 21/00* (2006.01)

(56) References Cited

U.S. PATENT DOCUMENTS

| | | | | |
|---|---|---|---|---|
| 2,020,567 A * | 11/1935 | Noske | ............. | B26B 15/00 |
| | | | | 30/247 |
| 2,287,347 A * | 6/1942 | Gillen | ............. | B26B 15/00 |
| | | | | 30/228 |
| 2,621,404 A * | 12/1952 | Koons | ............. | B26B 15/00 |
| | | | | 30/228 |
| 3,945,120 A * | 3/1976 | Ritz | ............. | B23D 49/165 |
| | | | | 30/393 |
| 3,971,132 A * | 7/1976 | Griffies | ............. | B23D 49/162 |
| | | | | 30/393 |
| 8,813,370 B2 * | 8/2014 | Pellenc | ............. | B26B 15/00 |
| | | | | 30/228 |
| 2001/0011420 A1 * | 8/2001 | Osada | ............. | B23D 49/165 |
| | | | | 30/392 |
| 2004/0055164 A1 * | 3/2004 | Molins | ............. | A01G 3/033 |
| | | | | 30/228 |
| 2008/0173138 A1 * | 7/2008 | Dayton | ............. | A01C 5/02 |
| | | | | 81/53.1 |
| 2009/0014251 A1 * | 1/2009 | McCracken | ............. | A01G 23/095 |
| | | | | 187/272 |
| 2009/0049694 A1 * | 2/2009 | Morris | ............. | B26B 19/382 |
| | | | | 30/43.6 |
| 2011/0056082 A1 * | 3/2011 | Nie | ............. | A01G 3/037 |
| | | | | 30/228 |
| 2011/0214292 A1 * | 9/2011 | Heh | ............. | B26B 13/04 |
| | | | | 30/228 |
| 2012/0174416 A1 * | 7/2012 | Nelson, II | ............. | A01G 3/085 |
| | | | | 30/276 |
| 2013/0263456 A1 * | 10/2013 | Zhong | ............. | B26B 7/005 |
| | | | | 30/173 |
| 2015/0283714 A1 * | 10/2015 | Sandefur | ............. | B26B 15/00 |
| | | | | 30/210 |
| 2015/0313089 A1 * | 11/2015 | Cecchi | ............. | A01G 3/02 |
| | | | | 30/228 |

* cited by examiner

HAND-HELD POWER TOOL, AND IN PARTICULAR ELECTRIC PRUNING SHEARS WITH HEAT SINK

TECHNICAL FIELD

The present invention concerns a handheld power tool and, in particular, an electric pruning shears that can be used for trimming and harvesting, especially for cutting vines and fruit trees. In particular, it relates to a pruning shears provided with a remote electrical power source, such as a battery source that can be carried on the user's belt or back. The invention can also be used for pruning shears with a built-in power source. In general, the invention concerns handheld power tools and, in particular, tools having a plastic or composite housing.

STATE OF PRIOR ART

Documents D1, D2, and D3, references for which are provided at the end of the description, describe pruning shears that can be used for the work of harvesting and trimming.

Document D1 illustrates a pruning shears having a housing, in the shape of a hollow body, one part of which forms a handgrip, and within which are housed an electric motor and a transmission that connects the motor to a movable blade. The primary function of the transmission is to communicate the movement of the rotary motor to a movable blade mounted in pivoting manner on the housing. The movable blade can pivot from an open position to a closed position with respect to a stationary blade.

The transmission has various elements, such as a reducer, connected to the motor shaft, a ballscrew-nut mechanism, mounted on the reducer outlet to convert the rotational movement of the motor into a movement of translation, then links that connect a sprocket on the ballscrew-nut mechanism to a cam on the movable blade.

The electric motor is powered by a remote power source comprising an electric storage battery. As shown in document D2, the remote power source can be carried, primarily on the user's belt or back. It is connected to the pruning shears by a suitable power cord.

The use of a remote power source not only allows for increased autonomy when using the pruning shears but also allows the power of the motor to be increased when compared to tools with integrated batteries.

The electrical power consumed by the motor varies depending on how the pruning shears are used. Absorbed electrical power is high, for example, when trimming fruit trees or large diameter vine branches. It can reach peak values on the order of a kilowatt.

DISCLOSURE OF THE INVENTION

In spite of the high output of pruning shears and the sharply reduced friction, a portion of the electrical power consumed by the tool is inevitably transformed into heat. The main sources of heat in pruning shears are the motor, the rotor bearing, and the transmission reducer. These elements are generally housed in a part of the tool that forms the handgrip.

In the event of intensive and prolonged use, made possible by high-capacity power sources, the heat dissipated heats the tool handgrip unacceptably. The phenomenon is accentuated by the choice of materials used for the housing. The materials for the housing are preferably lightweight and comfortable when gripping the tool, such as plastic materials, which do not promote heat dissipation. The user's hand on the grip of the tool and, thus, on the housing, is also a barrier to the evacuation of heat. All these factors contribute to increasing the temperature of the tool, especially the handgrip, and make its use uncomfortable.

The problem of heat generation is not unique to pruning shears but is especially prominent in such tools. Moreover, the possibilities for modifying the structure of pruning shears so they generate less heat are limited for several reasons.

One is the highly compact construction. Indeed, a portion of the housing forming the handgrip of the pruning shears is designed so that it can be easily gripped in the hand. Consequently, the available space in the housing is limited. The same is true of the elements housed within it, especially the motor and its transmission, which generate and transmit the power required for the tool's operation.

A second reason is associated with the requirements of comfort when gripping the tool and lightness. These requirements are intended to limit the fatigue of the user, who may be required to use the tool for several hours. On the other hand, they dictate the choice of materials for fabricating the housing.

Finally, a third reason is associated with the need for robust and reliable assembly of the tool's elements, while allowing it to be partly disassembled for maintenance and cleaning.

A goal of the invention is to obviate the above difficulties and propose a pruning shears with improved thermal comfort for the user's hand, in spite of intensive use.

One particular goal is a pruning shears having a structure that strongly limits heating of the handgrip.

Another goal is to propose pruning shears that allow for improved assembly and provide particularly robust and long-lasting construction.

To achieve these goals, the invention proposes a handheld power tool and, in particular, an electric pruning shears comprising an electric motor, a cutting element, and a transmission connecting the electric motor to the cutting element. The transmission and electric motor are housed in a main housing that can serve as a handgrip for the pruning shears. In accordance with the invention, the pruning shears comprises an intermediate housing of a material that is a good heat conductor. The intermediate housing is in thermal contact with the electric motor and housed in the main housing. The pruning shears also comprises one or more heat sinks. The heat sink or sinks are connected to the intermediate housing and project beyond the exterior of the housing.

The intermediate housing can be made of a single piece or, preferably, in two removable adjacent parts, such as two half-shells.

By transmission we refer to all the elements that assist in transmitting the movement of the motor to the cutting element. The transmission may have, for example, a reducer, a ball screw-nut mechanism, bearings, and a cam. It can be used to convert the motor's rotational movement into a movement of translation and the movement of translation into a pivoting movement of a blade of the cutting element.

The cutting element may have at least one movable blade. For example, it comprises a movable blade pivoting with respect to a stationary blade.

The motor may have a stator, a rotor, and roller bearings supporting the motor's rotation.

We consider the intermediate housing to be in contact with the motor when it is in contact with a housing of the motor or directly with the stator, and/or the motor bearings.

The intermediate housing can also be in thermal contact with the elements of the transmission, for example, a reducer, mounted on the motor shaft, a reducer gear, or a transmission bearing.

A main function of the intermediate housing is to conduct a large portion of the heat produced by the different elements of the motor and/or transmission to the heat sink. This prevents heating the main housing and, therefore, the handgrip.

The intermediate housing can also serve in the assembly and to maintain the cohesion of the different parts of the motor and/or the transmission.

In a very simple embodiment of the intermediate housing, this can assume the shape of a case or sleeve, in which the motor housing, a reducer, and/or other transmission elements can be inserted. Preferably, insertion of the different parts into the sleeve is done in such a way that it promotes heat exchange.

In another embodiment, one that is especially compact, the intermediate housing can serve as a housing for the motor elements and/or a reducer coupled to the motor. In this case, the motor does not have its own cover. The stator and bearings of the motor are directly housed in the intermediate housing. In general, the intermediate housing can be designed to accommodate and retain all the elements having a part that rotates on the same axis as the motor shaft.

The intermediate housing, therefore, preferably comprises several parts, for example, two half-shells, which are assembled after integrating elements of the motor and/or the transmission. The half-shells can be assembled by screwing. They can also be assembled at each of their ends by means of an elastic ring. The elastic ring on at least one of the ends can be, for example, an elastic ring the "Circlips" type.

The intermediate housing can also have a mounting clamp for assembly of a reducer on the motor. This is the case primarily when the reducer comprises its own housing. The clamp may consist of a portion of the intermediate housing that extends beyond the motor and surrounds the reducer.

As follows from the above, the intermediate housing may serve as a means of attachment for the reducer on the motor or may serve directly as a shared retaining housing for the motor and reducer elements. Thus, it is possible to test or adjust the parameters of the assembly formed by the motor and the reducer before it is mounted in the main housing. These measures augment the manufacturing yield of the pruning shears and serve to eliminate defective elements before final assembly. They also help to minimize the size of all the mechanical parts or, at least, to optimize the size of all the functional parts (motor, reducer, etc.), in order to optimize the tool's mechanical performance.

The intermediate housing, a good heat conductor, is preferably made of a lightweight metal, such as aluminum or magnesium. It is housed in the main housing and can extend, primarily, into a portion of the main housing forming the handgrip of the pruning shears.

The main housing can be metal or, preferably, plastic. It comprises, for example, a shell in two parts screwed to one another and designed to accommodate and retain the internal components of the pruning shears, primarily the intermediate housing. A portion of the main housing also forms a handgrip. If required, this can be provided with a control element such as a trigger.

The heat sink is connected to the intermediate housing. It can be added to the intermediate housing or manufactured in a single piece with the intermediate housing. When the intermediate housing is itself formed of two half-shells joined together, one part of the sink can be formed on each of the two half-shells. For example, each half-shell can be provided with a fin of the sink. The sink projects beyond the exterior of the main housing when the intermediate housing is mounted in the main housing.

The heat collected by the intermediate housing is transmitted by conduction to the sink. It is then dissipated to the exterior of the pruning shears by radiation or convection upon contact with the surrounding air. The heat can also be dissipated by conduction to other external elements of the pruning shears, such as a guard. Several sinks or one sink in several parts can be provided. The main housing thus presents one or more passages for the sink. It may, in particular, present openings, such as slots, through which two fins of the sink project.

The sink is, preferably, arranged in a portion of the pruning shears that is not used as a handgrip. For example, it is arranged at one end of the handgrip. It can then form a guard or portion of a guard, that is, a mechanical protection for the user's hand.

The pruning shears can be provided with a guard that extends along the handgrip and forms a guard around the trigger. In this case, the sink can be used as a means of attachment for the guard.

Other characteristics and benefits of the invention will be made clear from the description of the figures that follows. This description is given for illustrative purposes and is non-limiting.

DETAILED DESCRIPTION OF THE EMBODIMENTS OF THE INVENTION

Figure 1:
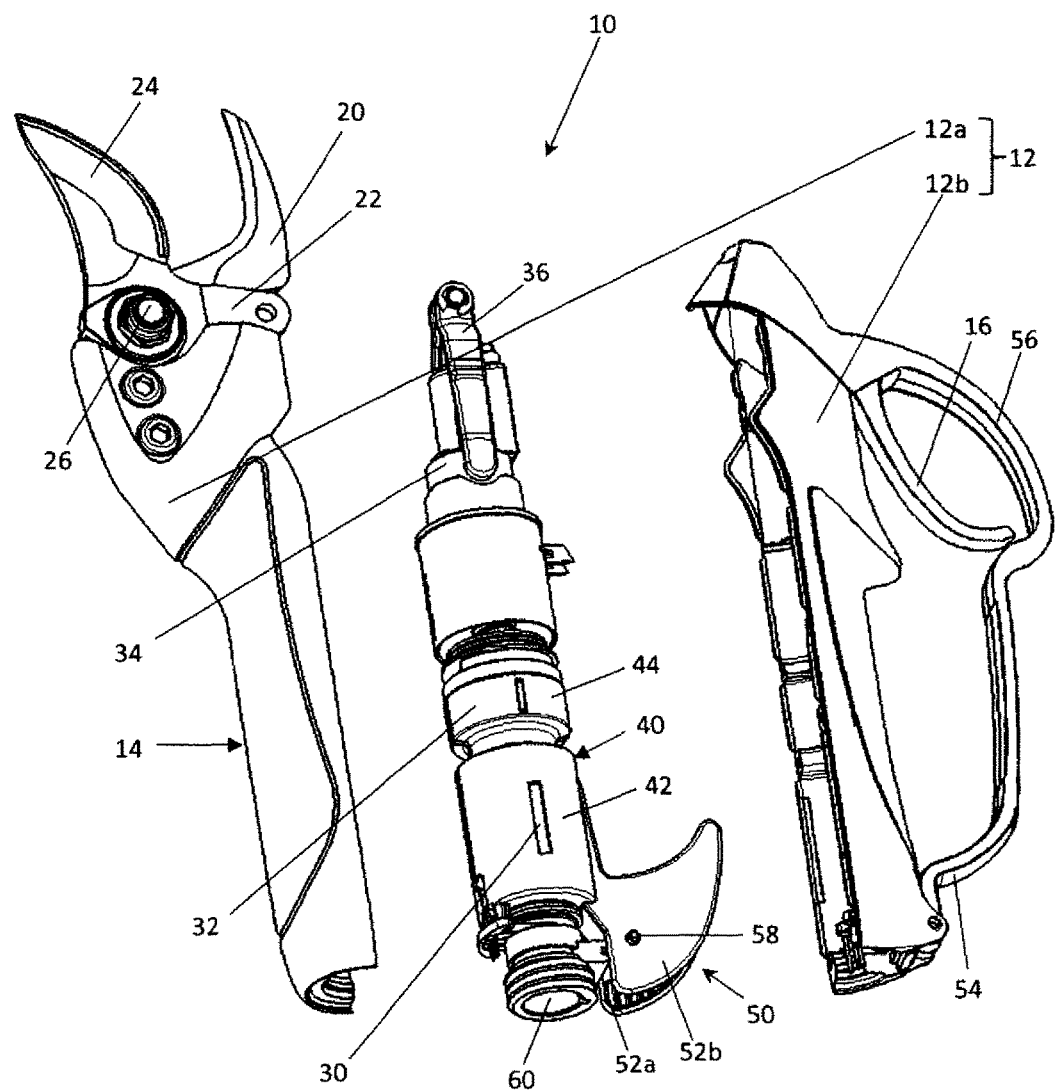
FIG. 1 is a partial exploded view of a pruning shears according to the invention.

FIG. 1 illustrates pruning shears 10 with main housing 12 forming handgrip 14. Main housing 12, preferably of plastic or a composite material, comprises upper shell 12a and lower shell 12b, assembled by screwing it to upper shell 12a. In addition to the handgrip, the main housing is also used for attachment of the cutting element. For example, an attachment bracket for stationary blade 20 is screwed to the upper shell. The housing also serves to accommodate and secure the elements of the pruning shears. In this way, it absorbs the loads of the cutting element and the loads generated by the internal elements.

Main housing 12 accommodates motor 30, planetary reducer 32, and ballscrew-nut mechanism 34. Ballscrew-nut mechanism 34 transforms the rotational movement of the motor into a translational movement. It is connected by links 36 to cam 22 of movable blade 24. The cam is moved by the links and causes movable blade 24 to pivot around pivot 26, which connects it to stationary blade 20. Movable blade 24 can, in particular, pivot from an open, rest position to a closed position on the stationary blade and vice versa. The movement of the blade is controlled by trigger 16 arranged in the front portion of handgrip 14.

Trigger 16 is associated with a position sensor and a printed circuit board configured to generate controls for the motor.

In FIG. 1 the motor and reducer are mounted in intermediate housing 40. The intermediate housing comprises first portion 42, designed to accommodate the motor and in thermal contact with the motor. First portion 42 can be formed, for example, like a sleeve in which the motor is accommodated by means of an interference fit. Second portion 44 of the intermediate housing serves as an attachment flange for reducer 32 on the motor. Second portion 44 of the intermediate housing can also be formed like a sleeve—for accommodating the reducer.

In a simpler version, the reducer may not be accommodated in the intermediate housing. Nonetheless, there is a benefit in mounting the assembly formed by the motor and reducer in the intermediate housing. This then serves not only as a heat sink but also as a point of attachment to hold the reducer on the motor. Motor 30 can have a housing integral to it and that is inserted into first portion 42 of the intermediate housing. The intermediate housing can also serve as a housing or support for the elements that constitute the motor and/or reducer. This other possibility is described with reference to FIG. 2.

As mentioned above, it is possible, by means of the intermediate housing, to test the motor-reducer unit before assembly with the other elements of the pruning shears and before mounting it in the main housing.

Returning to FIG. 1, we see that intermediate housing 40 is provided with heat sink 50. Heat sink 50 comprises two cooling fins 52a, 52b, which project outside main housing 12 through suitable openings. The fins of the sink are arranged at one end of the main housing, or the tool body, opposite the end that holds blades 20, 24 of the cutting element. The fins provide a cooling function primarily. The fins promote the dissipation of heat energy produced by the motor and/or reducer, and transmitted to the intermediate housing. The dissipation of heat energy in cooling fins 52a, 52b reduces the temperature inside main housing 12 and limits heat buildup in handgrip 14.

Cooling fins 52a, 52b, situated at the rear of the handgrip, are curved in the direction of the handgrip, with a radius of curvature suitable to the user's hand. Thus, sink 50 also serves as a first protective guard for the handgrip and, more specifically, for the hand of the user holding the handgrip. Second guard 54 extends the first guard formed by heat sink 50 to the front portion of the pruning shears accommodating the cutting element. Second guard 54 can be metal or plastic. It runs alongside handgrip 14 and forms guard 56 for trigger 16.

Second guard 54 is attached to main housing 12 in front of trigger 16. It is also attached to sink 50 by means of pin 58. Use of the sink as an attachment element for the guard provides a solid anchorage for the latter and contributes to the overall solidity of the pruning shears.

Connector 60 is located in the rear of the pruning shears near motor 30. It is used to connect pruning shears 10 to a remote electrical power source by means of a power cord. The electrical power source, such as a storage battery, like the cord, is not shown in FIG. 1.

Figure 2:
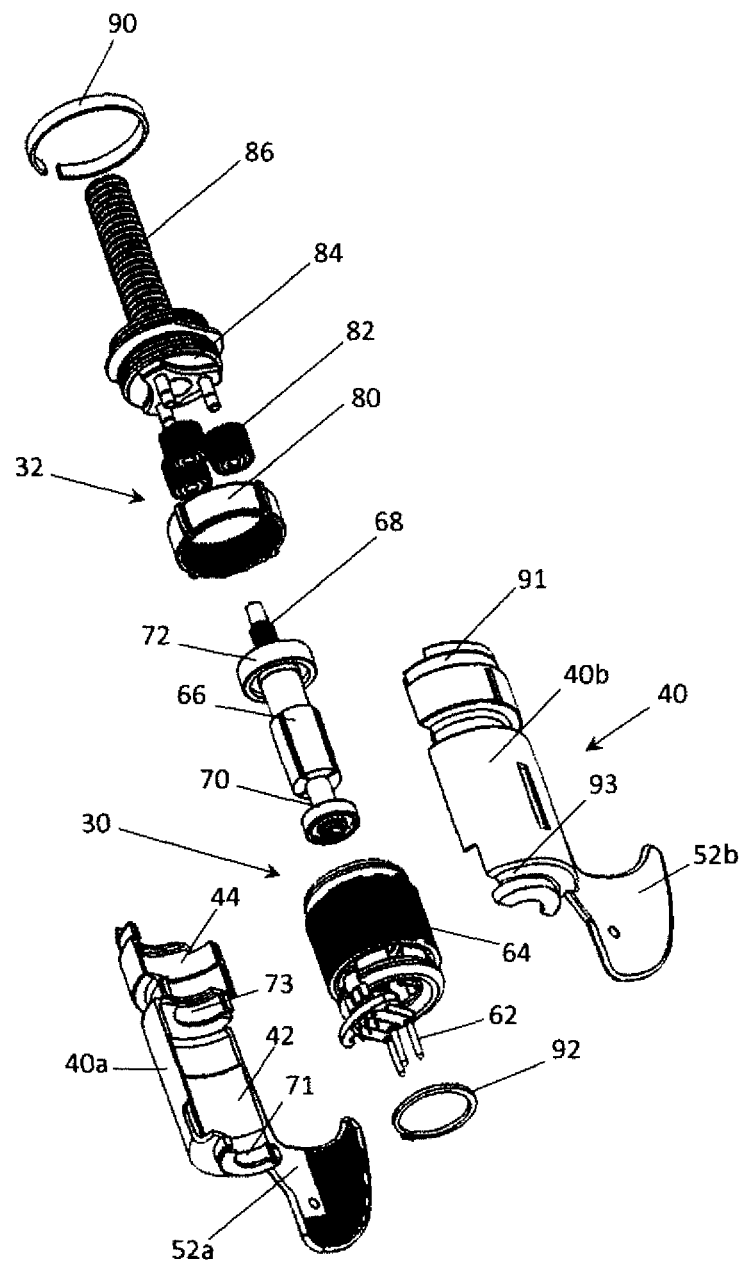
FIG. 2 is an exploded view of an intermediate housing of the pruning shears of FIG. 1 and a motor-reducer assembly housed therein.

FIG. 2 shows a specific embodiment of the intermediate housing and a motor-reducer assembly housed within intermediate housing 40.

Housing 40 of FIG. 2 is shown in the form of two half-shells 40a, 40b, which serve directly as a housing for the elements of motor 30 and reducer 32. In particular, first portion 42 of the intermediate housing is designed to house stator 64 of the motor. In the rear of stator 64 can be seen pins 62, which are the pins of connector 60 mentioned with reference to FIG. 1.

A rotor 66 of the motor, concentric with respect to stator 64, is mounted on bearings 70, 72, which are respectively accommodated in corresponding housings 71, 73 of intermediate housing 40.

Similarly, second part 44 of intermediate housing 40 no longer serves simply as an attachment flange for a reducer, as in FIG. 1, but as a housing for the reducer elements. In particular, ring gear 80 of the reducer is directly housed and secured in second portion 44 of the intermediate housing. In other words, the reducer has no housing of its own but its elements are directly accommodated in the intermediate housing.

In the example shown in FIG. 2, the reducer comprises three satellites 82, rotating in ring gear 80. Satellites 82, accommodated on satellite carrier 84, are rotationally driven by pinion 68 integral with rotor shaft 66. Satellite carrier 84 is mounted on screw 86, coaxial with the motor shaft, which is part of the ballbearing ball screw mechanism referred to above with reference to FIG. 1.

The two half-shells 40a, 40b of the intermediate housing are assembled by means of first elastic ring 90, accommodated on shoulder 91 of the half-shells, and by means of a second elastic ring 92 accommodated in groove 93 of the half-shells. The second ring is of the "Circlips" type.

We can further observe that each half-shell 40a, 40b is formed from a single piece respectively with one of fins 52a, 52b of the heat sink.

DOCUMENTS CITED

D1: FR 2614568
D2: G8614677
D3: EP 2156732

The invention claimed is:

1. Handheld power tool, in particular, a pruning shears, comprising an electric motor, a cutting element, and a transmission connecting the electric motor to the cutting element, the motor and transmission being housed in a main housing, characterized by
an intermediate housing of a heat conducting material, housed in the main housing, the intermediate housing being in thermal contact with the electric motor, and
at least one heat sink connected to the intermediate housing and projecting outside the main housing.

2. Handheld power tool according to claim 1, in which the intermediate housing comprises two adjacent and removable parts.

3. Handheld power tool according to claim 1 in which the intermediate housing is made of a single piece.

4. Handheld power tool according to claim 1, in which the intermediate housing is also in thermal contact with at least one transmission element.

5. Handheld power tool according to claim 1, in which the transmission comprises a reducer and in which the intermediate housing is in thermal contact with the reducer.

6. Handheld power tool according to claim 5, in which the reducer comprises a ring gear directly attached to the intermediate housing.

7. Handheld power tool according to claim 1, in which the intermediate housing comprises a flange for mounting the reducer on the motor.

8. Handheld power tool according to claim 1, in which the motor comprises a stator and roller bearings the stator and roller bearings being directly attached to the intermediate housing.

9. Handheld power tool according to claim 1, in which the motor has a housing inserted into the intermediate housing.

10. Handheld power tool according to claim 1, in which the sink is made of a single piece with the intermediate housing.

11. Handheld power tool according to claim 10, in which the handgrip is provided with a guard, the guard being connected to the heat sink.

12. Handheld power tool according to claim 10, in which the heat sink is placed near the handgrip of the pruning shears to form a protective guard of the handgrip.

13. Handheld power tool according to claim 1, in which the cutting element is integral with a first end of the main housing and in which the sink projects outside the main housing at a second end of the main housing, appreciably opposite the first end.

14. Handheld power tool according to claim 1, in which the heat sink has two fins.

15. Handheld electric power tool according to claim 1, in which the main housing forms a handgrip and in which the intermediate housing extends inside the handgrip.

\* \* \* \* \*